(12) United States Patent
Brooks et al.

(10) Patent No.: US 6,341,748 B1
(45) Date of Patent: Jan. 29, 2002

(54) EMERGENCY EXIT SYSTEM

(75) Inventors: Christopher J. Brooks, Dartmouth; Albert P. Bohemier, Cole Harbour; Lee R. Miller, Dartmouth, all of (CA)

(73) Assignee: Her Majesty the Queen in right of Canada, as represented by the Minister of National Defence, Ottawa (CA)

( * ) Notice: Subject to any disclaimer, the term of this patent is extended or adjusted under 35 U.S.C. 154(b) by 0 days.

(21) Appl. No.: 09/559,667

(22) Filed: Apr. 28, 2000

Related U.S. Application Data

(60) Provisional application No. 60/131,670, filed on Apr. 29, 1999.

(51) Int. Cl.[7] ................................................. B64C 1/14
(52) U.S. Cl. ................................................. 244/129.5
(58) Field of Search ........................... 244/129.3, 129.4, 244/129.5; 49/141, 463, 465, 466, 316, 319

(56) References Cited

U.S. PATENT DOCUMENTS

| | | | | |
|---|---|---|---|---|
| 2,797,884 A | * | 7/1957 | Peed, Jr. | |
| 3,051,280 A | * | 8/1962 | Bergman et al. | |
| 3,647,169 A | * | 3/1972 | Allwright et al. | 244/129 |
| 4,180,943 A | * | 1/1980 | Smith et al. | 49/279 |
| 4,199,120 A | * | 4/1980 | Bergman et al. | 244/129.5 |
| 4,216,725 A | * | 8/1980 | Hallam | 105/348 |
| 4,220,298 A | * | 9/1980 | Willis | 244/129.5 |
| 4,557,441 A | * | 12/1985 | Aspinall | 244/129.4 |
| 4,666,106 A | * | 5/1987 | Kohout | 244/129.3 |
| 4,978,089 A | * | 12/1990 | Alquier et al. | 244/129.5 |
| 5,085,017 A | * | 2/1992 | Hararat-Tehrani | 52/1 |
| 5,156,359 A | * | 10/1992 | Noble et al. | 244/129.4 |
| 5,337,977 A | * | 8/1994 | Fleming et al. | 244/129.5 |
| 5,544,449 A | * | 8/1996 | Amelio et al. | 49/383 |
| 5,826,824 A | * | 10/1998 | Martin et al. | 244/129.3 |
| 5,931,415 A | * | 8/1999 | Lingard et al. | 244/129.5 |
| 6,027,073 A | * | 2/2000 | Gratien Ferrier | 244/129.3 |
| 6,059,231 A | * | 5/2000 | Dessenberger, Jr. | 244/129.5 |
| 6,116,542 A | * | 9/2000 | Erben | 244/129.5 |

\* cited by examiner

*Primary Examiner*—Peter M. Poon
*Assistant Examiner*—Kevin Jakel
(74) *Attorney, Agent, or Firm*—George A. Seaby

(57) ABSTRACT

An emergency exit system for use primarily in a helicopter or other aircraft includes a panel closing an opening in the fuselage of the aircraft, a plurality of latches for releasably securing the panel in the opening; a release mechanism including slides on each side of the opening for retracting the latches to release the panel; a drive for operating the slides, a drive latch for releasably locking the drive in a cocked condition; and a plurality of principal grab bars strategically located in recesses adjacent to the opening and connected to the drive by cables, whereby actuation of any one of the grab bars causes simultaneous release of all of the latches so that the panel can be jettisoned.

11 Claims, 13 Drawing Sheets

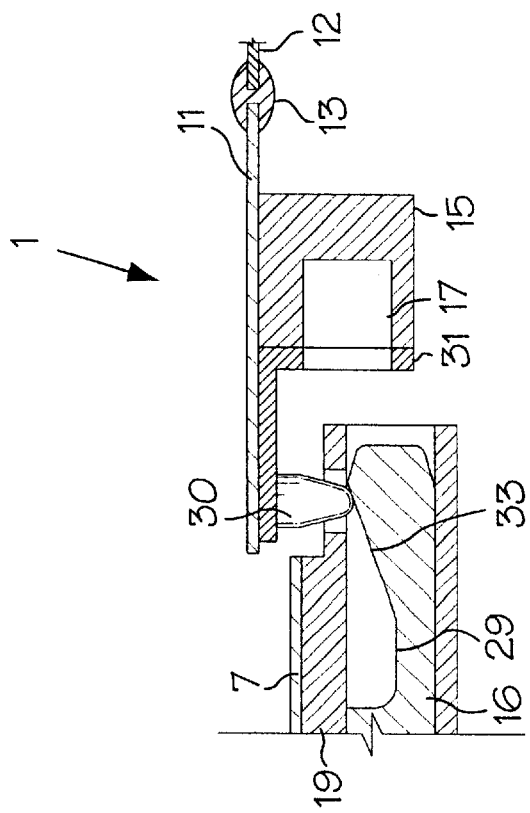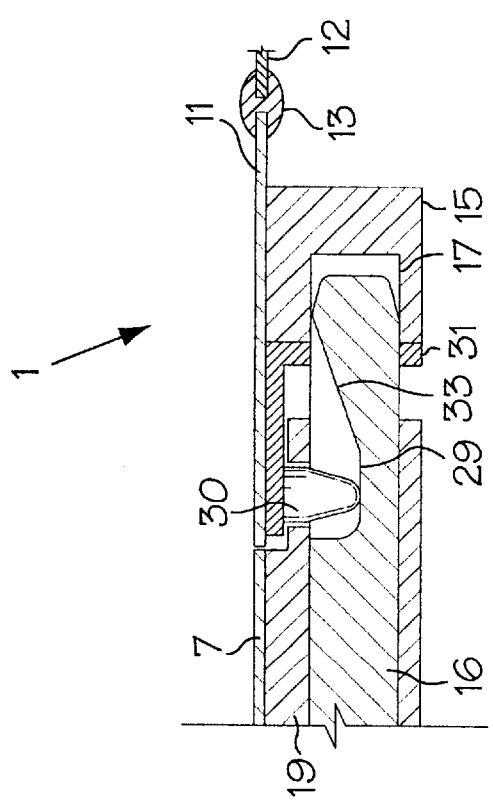

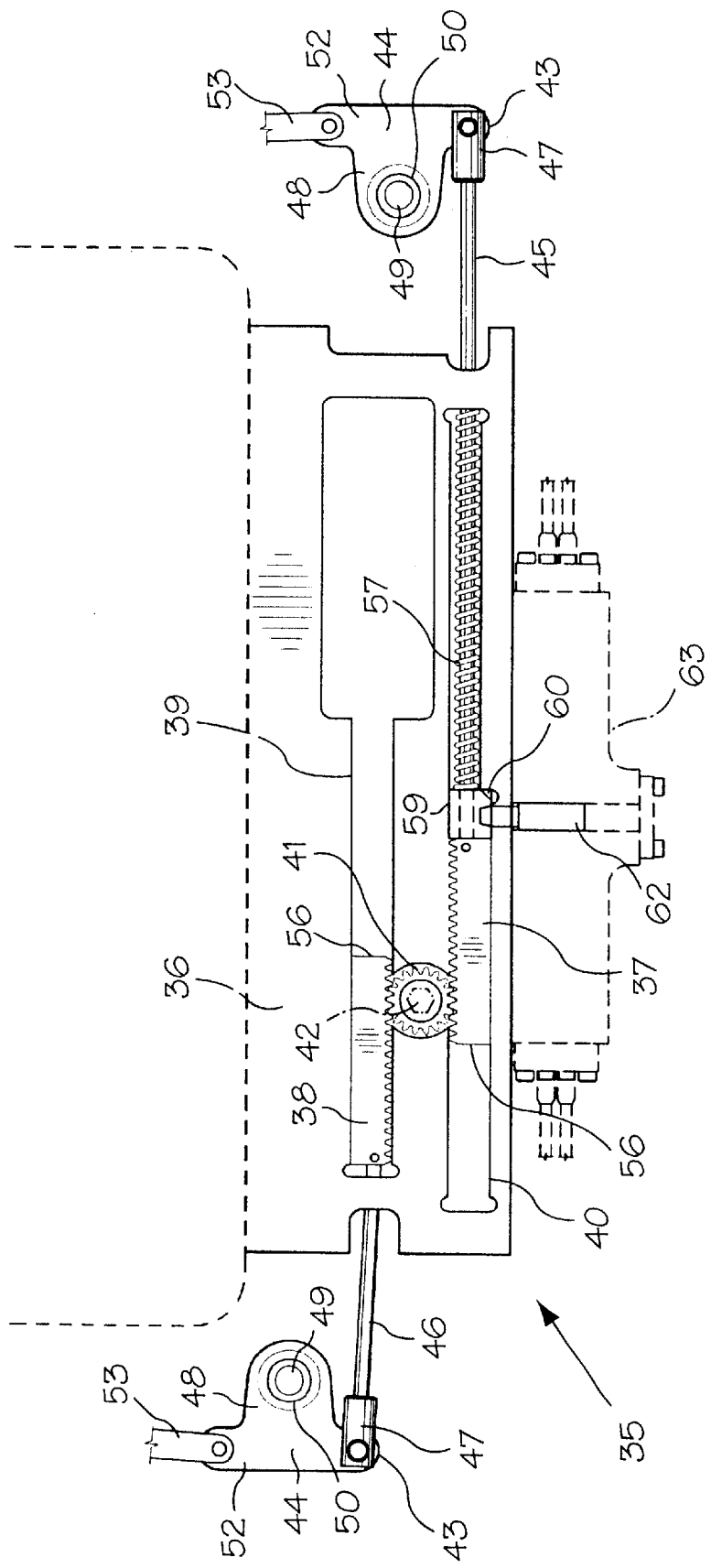

EMERGENCY EXIT SYSTEM

This application claims benefit of provisional application Ser. No. 60/131,670 Apr. 29, 1999.

BACKGROUND OF THE INVENTION

1. Field of the Invention

This invention relates to an emergency exit system, and in particular to an emergency exit system for use in a helicopter or other aircraft.

While the system of the present invention was designed specifically for use in an aircraft, it will be appreciated that the system could be used in other vehicles such as trains or buses.

2. Discussion of the Prior Art

Applicants' international patent application PCT/CA98/00739 filed on Jul. 31, 1998 discloses an emergency exit system of generally the same type as disclosed herein. As mentioned in the PCT application, vehicle accidents occurring in water have a lower survival rate than accidents occurring on land. In water accidents, the aircraft usually sink very rapidly, either in an upright or inverted position. Underwater conditions are drastically different from land based conditions. Visibility is reduced—the majority of people can see only 1.5 meters underwater and 3.1 meters in the best lit conditions. Survivors of a crash or forced landing must depend on their breath-holding ability to make a successful escape. Generally, a person's breath-holding ability is reduced 25–50% in water under 15° C . Maximum breath-holding time can be as short as 10 seconds. Survivors are often disoriented due to the sudden immersion in water, loss of gravitational references, poor depth perception, nasal inhalation of water and darkness. Disorientation is magnified when the vehicle is inverted. Under the latter condition, finding a handle to jettison an escape door or window, which is a simple procedure to execute in an upright position on dry land, can be a most challenging task even if the handle is only a few centimeters away from the survivor's hand.

Usually handles for opening escape doors or windows are small, and are positioned between knee and chest level. The various positions, i.e. locked or secured and released, would not be obvious to the survivor unless he or she is familiar with the particular escape system. Existing escape hatches for aircraft are difficult to replace or reinstall once jettisoned. Consequently, even persons being trained as aircrew do not receive practice in emergency escape procedures. Most existing mechanisms are adapted to remove an entire door or window, including the frame, requiring a complicated jettison mechanism, which is not always dependable. Most escape hatches are operated by movement of a single handle in one direction only. Thus, valuable time and effort can be wasted in attempting to operate the hatch release mechanism. Moreover, existing systems do not provide feedback, i.e. there is no visual or other indication that the door, window or hatch as been successfully jettisoned.

GB-A-761 627 and U.S. Pat. No. 3,851,845 disclose systems for the jettisoning of aircraft canopies or doors which are inappropriate for use in a door or window release. The U.S. patent teaches the use of lever or a lever and a handle combination for releasing a door. When submerged in water such a system could be difficult to operate, particularly when it is necessary to operate a handle and a separate lever to effect release of the door.

GENERAL DESCRIPTION OF THE INVENTION

An object of the present invention is to provide an emergency exit system of the type which includes at least one easily accessible actuator adapted to operate in more than one direction to affect release of a Window or door panel to provide an escape exit.

In applicant's earlier invention, cables were mainly relied upon to release a panel. When repeatedly subjected to longitudinal forces, cables tend to stretch. Accordingly, while cable are still used in the present case they play a smaller roll in operation of the exit system, namely to release a spring operated drive which effects panel release.

Accordingly, the present invention relates to an emergency exit system including a panel for closing in an opening in a vehicle wall comprising a plurality of spaced apart panel latch means for releasably latching said panel in said opening; release means for simultaneously releasing all said panel latch means, drive means for operating said release means; drive latch means for releasably retaining said drive means in an inoperative condition; and principal actuating means rotatable in said vehicle wall proximate said opening for releasing said drive means, whereby rotation of said principal actuating means causes said drive means operate said release means to simultaneously release all said panel latch means.

The use of an opposed auxiliary release handles on the inside and outside of the vehicle provides an alternate means for operating the panel latch means, and permits the operation of the panel latch means by a rescuer from the exterior of the vehicle.

The invention described herein also includes light means in said actuating means which provide a visual aid for locating the escape panel, and for positively indicating that the panel has been jettisoned. The light means is adapted to operate in a steady (always on) or a strobe mode. In one mode, the light means acts as a locating aid, and in the other mode, the light means provides a positive indication that the panel has been jettisoned.

The provision of a simple mechanism for replacing the panel in the opening encourages practice of escape procedures before an emergency situation arises. Whereas it is difficult and time consuming to replace existing escape hatches, once released, using the system of the present invention, the panel can be re-mounted in the opening typically in 5 to 10 seconds.

BRIEF DESCRIPTION OF THE DRAWINGS

The invention is described below in greater detail with reference to the accompanying drawings, which illustrate a preferred embodiment of the invention, and wherein:

FIGS. 5 and 6 are cross-sectional views of a jettison pin assembly used in the system of FIGS. 1 and 2;

FIG. 7 is a front view of a drive mechanism used in the system of FIGS. 1 and 2;

DESCRIPTION OF THE PREFERRED EMBODIMENT

Figure 1:
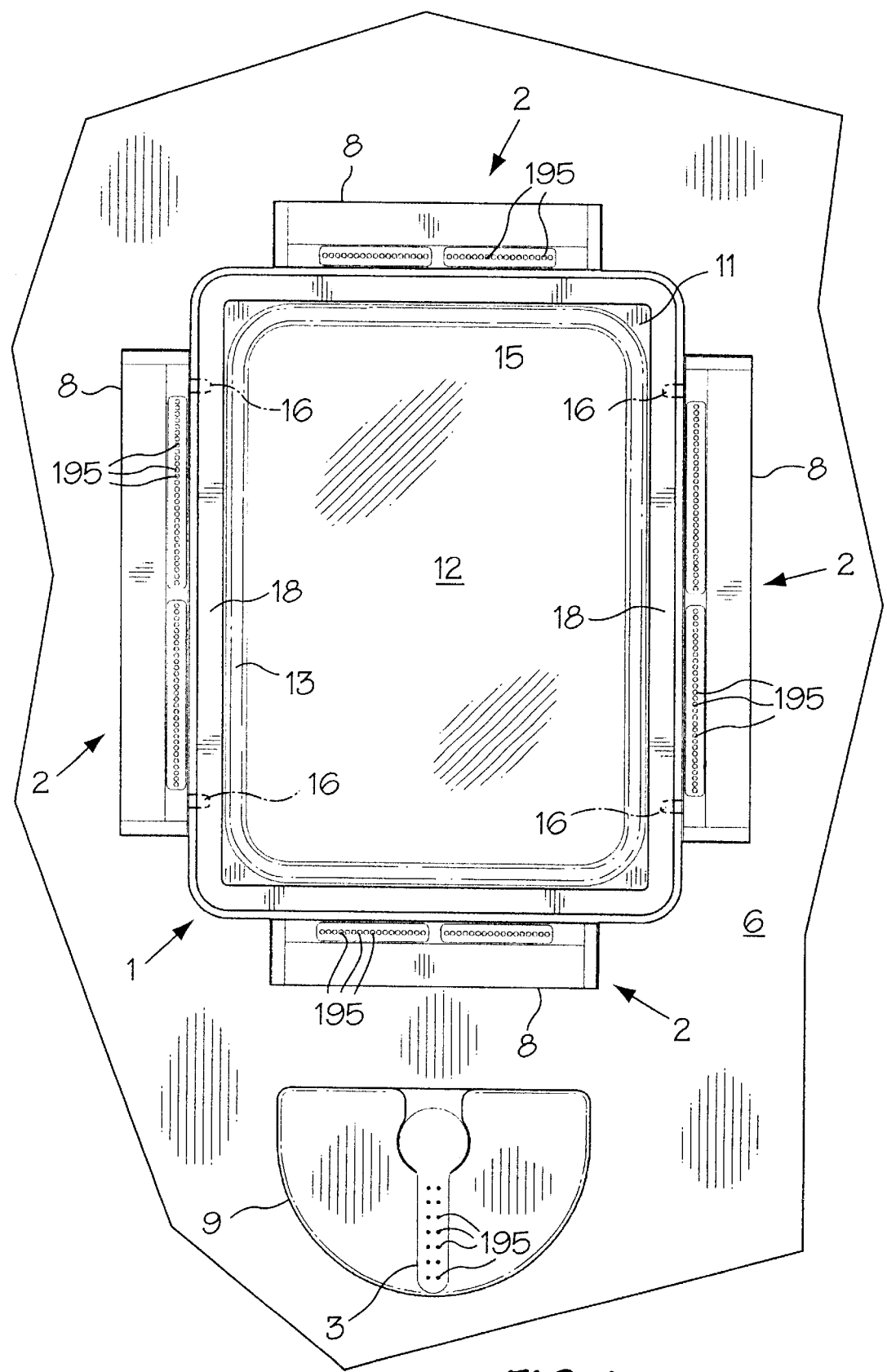
FIG. 1 is a schematic front view of a section of the interior of a helicopter fuselage incorporating an emergency exit system in accordance with the invention.
Figure 2:
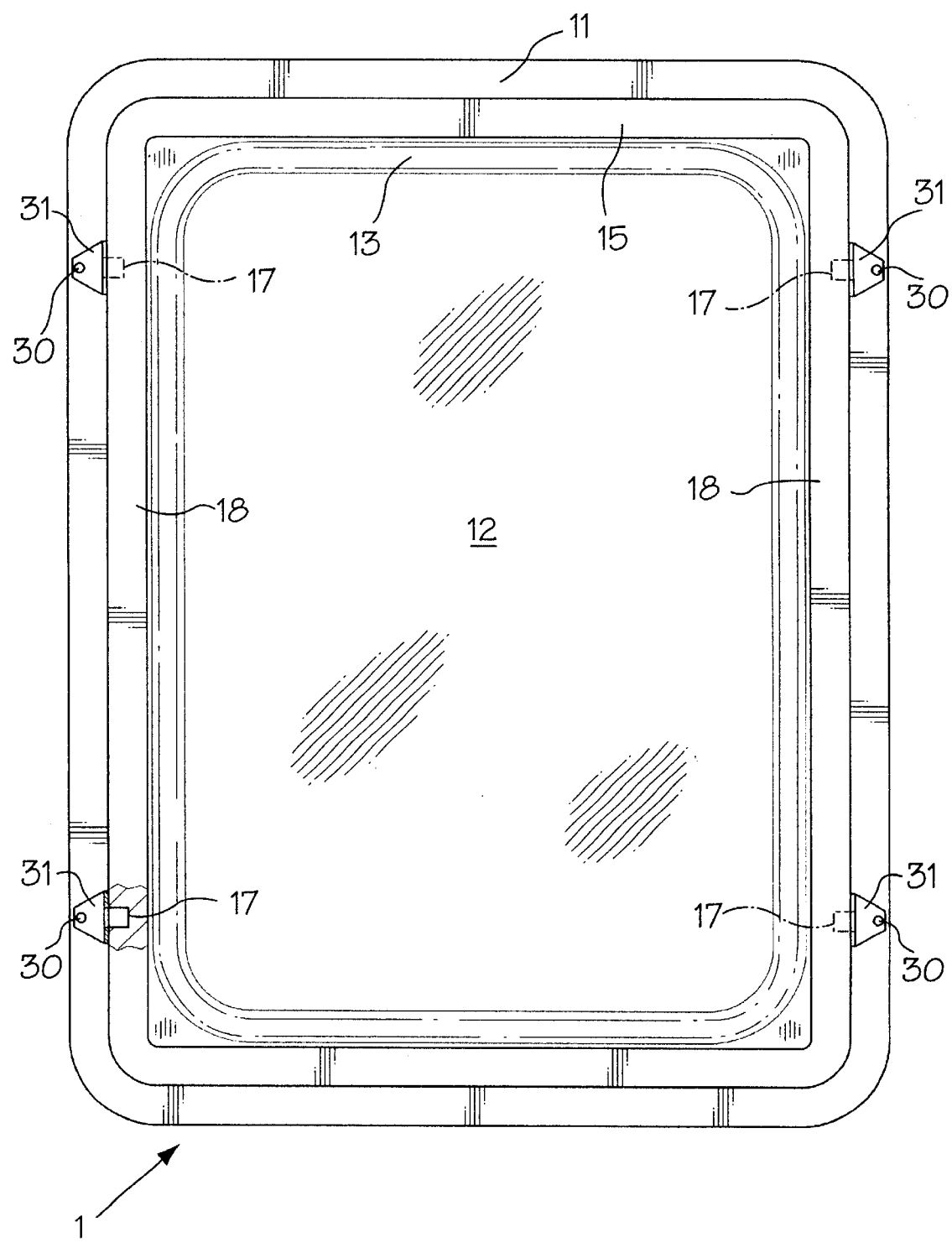
FIG. 2 is a partly sectioned front view of the interior of a window used in the system of FIG. 1.

Referring to FIGS. 1 and 2, the basic elements of the exit system visible from the interior of a helicopter include a window generally indicated at 1, which is mounted in an opening in a helicopter fuselage, four grab bar assemblies 2 generally indicated at 2 on all four sides of the opening, and an auxiliary release handle 3. The window is releasably mounted in a frame 4 (FIG. 3) between the inner skin 6 and the outer skin 7 (FIG. 13) of the fuselage. The grab bar assemblies 2 and the auxiliary release handle 3 are located in recesses 8 and 9, respectively in the inner skin 6 of the fuselage.

The window 1 is defined by a metal panel 11 normally closing the opening in the fuselage, and a transparent plastic pane 12 which is retained in an opening in the panel 11 by a flexible rubber molding 13. As a last resort, e.g. in the event of a mechanical failure of the escape system described below, the pane 12 can be physically knocked out of the panel 11 to permit escape from the aircraft. A square cross section reinforcing bar 15 connected to the panel 11 extends around the periphery of the rubber molding 13. In such circumstances, the window panel 11 remains in place in the frame 4 which reduces the size of the egress opening.

Figure 3:
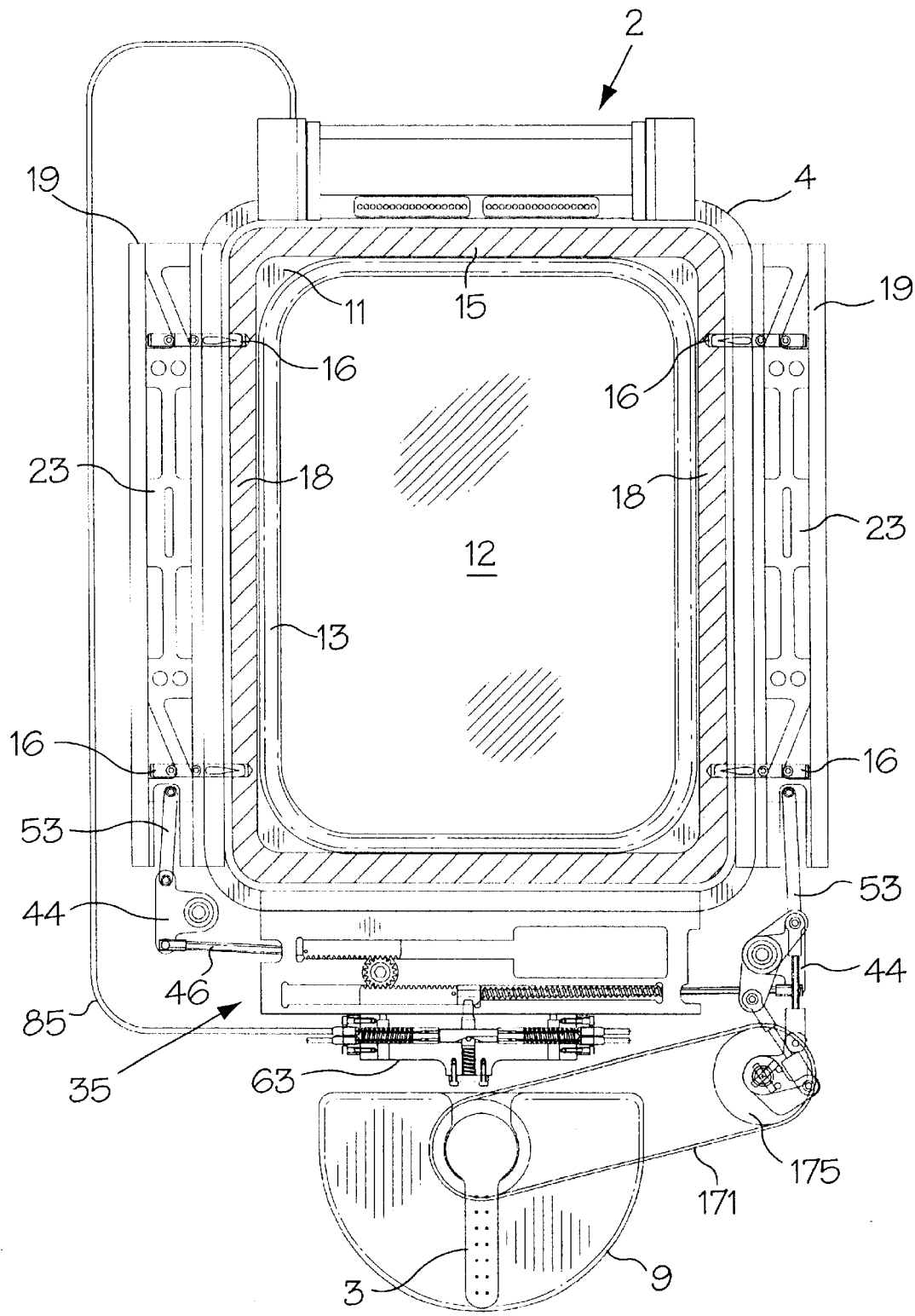
FIG. 3 is a partly sectioned view of the interior of the system of FIG. 1.
Figure 4:
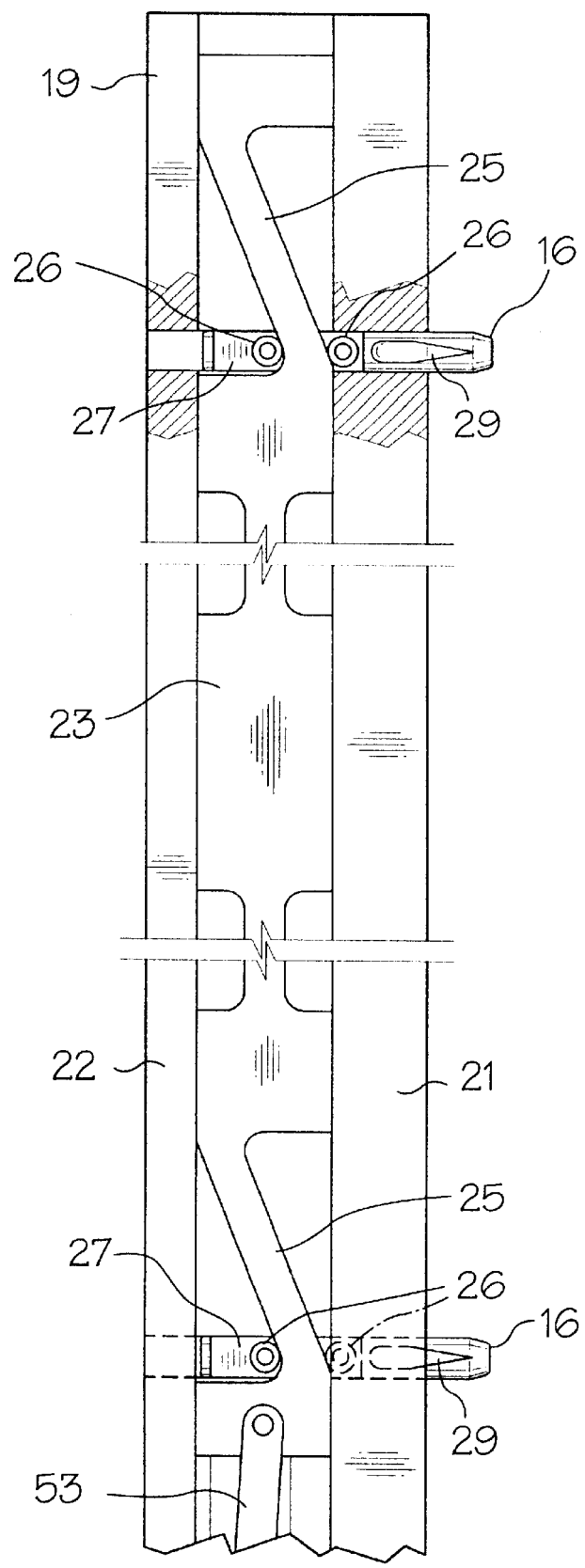
FIG. 4 is a partly sectioned front view of a portion of a release assembly used in the system of FIGS. 1 and 2.

The window 1 is normally retained in the opening by two pairs of pins 16 extending out of the frame 4 into sockets 17 (FIG. 2) in the sides 18 of the bar 15. Referring to FIGS. 3 and 4, each pair of pins 16 is slidably mounted in tracks 19 for lateral movement into and out of the sockets 17. As best shown in FIG. 4, one track 19 is mounted on each side of the window opening, the tracks 19 forming the sides of the frame 4, The pins 16 are slidably mounted in the sides 21 and 22 of the track 19 for lateral movement into and out of the sockets 17 in the bar 15 of the window 1. A cam slide 23 is slidably mounted in the track 19 for causing movement of the pins 16. For such purpose, the cam slide 23 includes inclined ribs 25 bordered by a pair of rollers 26 in recesses 27 in the pins 16. Vertical movement of the slide 23 thus causes simultaneous lateral movement of the pins 16.

Movement of the pins 16 from the window engaging to the release position, not only releases the window, but results in mechanical jettisoning of the window. With reference to FIGS. 4 to 6, a generally drop-shaped groove 29 is provided in each pin 16 near the outer free end thereof. When the window 1 is in the closed position (FIG. 5) a jettison pin 30 (FIGS. 2, 5 and 6) extends inwardly from an L-shaped bracket 31 mounted on the reinforcing bar 15 of the window into the groove 29. During movement of the pin 16 towards the release position (FIG. 6) the pin 30 rides up a ramp 33 at the tapering outer end of the groove 29 to push the window 1 out of the opening.

Vertical movement of the slides 23 is effected by a drive mechanism generally indicated at 35 (FIG. 3). As best shown in FIG. 7, the drive mechanism 35 includes a block 36 mounted beneath the window 1 between the inner and outer skins 6 and 7, respectively of the fuselage. A pair of racks 37 and 38 are slidably mounted in slots 39 and 40, respectively in the block 36. A pinion 41 with a hexagonal recess 42 in the outer surface thereof is rotatably mounted in the block 36 in constant engagement with both racks 37 and 38, whereby movement of one rack 37 in one direction causes a corresponding movement of the other rack 38 in the opposite direction. The recess 42 in the outer surface thereof is accessed via an opening (not shown) in the outer skin 7 of the fuselage when replacing the window 1 in the opening as described hereinafter in greater detail. The outer ends of the racks 37 and 38 are pivotally connected to bottom arms 43 of bell crank levers 44 by linkage rods 45 and 46, respectively and clevises 47. The bodies 48 of the levers 44 are securely connected to shafts 49, the ends of which are rotatably mounted in bearings 50. The bearings 50 are mounted in small frames (not shown) between the inner and outer skins 6 and 7 proximate the bottom corners of the window 1. The top arms 52 of the levers 44 are pivotally connected to the bottom ends of the slides 23 by a linkage bars 53. Thus, lateral reciprocating movement of the racks 37 and 38, and consequently of rods 45 and 46 results in a corresponding rotation of the levers 44 and vertical movement of the slides 23. As mentioned above, such vertical movement of the slides 23 causes retraction or extension of the pins 16.

In the extended or locked position of the pins 16, the inner free ends 56 of the racks 37 and 38 oppose each other. The racks 37 and 38 are biased to the window release positions by a helical spring 57 mounted on the rod 45. The spring 57 extends between one end of the slot 40 in the block 36 and abuts a small sleeve 59, which forms part of a release assembly. The rod 45 is slidable through the sleeve 59, which is slidable in to a wide end of the slot 40. Movement of the sleeve 59 toward the narrow end of the slot 40 (to the right in FIG. 7) is limited by a shoulder 60 between the wide and narrow ends of the slot 40. The sleeve 59 is retained in the window locking position by a pin 62, which forms part of a drive latch assembly.

Figure 8:
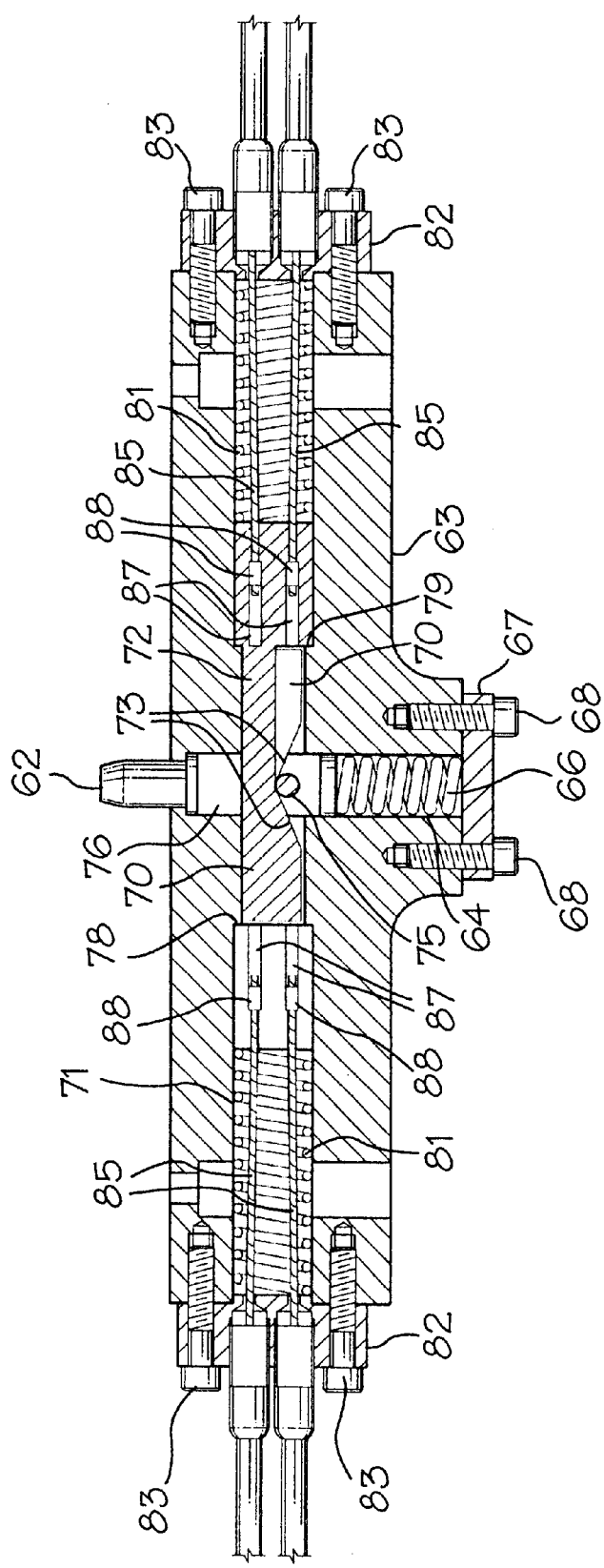
FIG. 8 is a longitudinal sectional view of a drive actuation assembly used in the system of FIGS. 1 and 2.

Referring to FIG. 8, the drive latch assembly includes a housing 63 which is mounted on the bottom end of the block 36 (FIG. 7). The pin 62 is slidably mounted in a vertical hole 64 in the housing 63. The pin 62 is biased to the extended sleeve engaging position by a helical spring 66 sandwiched between the bottom end of the pin 62 and a plate 67 connected to the housing 63 by bolts 68. The pin 62 is moved to the release position by a pair of opposed slides 70, which are slidably mounted in a passage 71 in the housing. Each slide 70 includes a narrow neck portion 72 (one shown) with a ramp 73 at one end thereof for engaging a roller 75 mounted in a notch 76 in the outer side of the pin 62. The slides 70 extend through the notch 76, intersecting the path of travel of the roller 75 during longitudinal movement of the pin 62. Movement of the slides 70 into the housing 63 is limited by shoulders 78 on the slides which engage shoulders 79 in the passage 71. When either slide 70 is moved longitudinally in the housing 63, i.e. outwardly, the ramp 73 pushes the roller 75 and consequently the pin 62 downwardly to release the sleeve 59. Once the sleeve 59 is released, the spring 57 forces the bottom rack 37 to the left (in FIG. 7) and the pinion 42 moves the rack 38 to the right. Such movement causes rotation of the levers 44 and downward movement of the slides 23 to force the pins 16 to the release position.

The slides 70 are retained in the inner positions (FIG. 8) by helical springs 81 retained in the outer ends of the passage 71 by end plates 82 connected to the ends of the housing 63 by bolts 83. Movement of either of the slides 70 against the bias of the springs 81 is effected by cables 85 the ends of which are slidably retained in passages 87 in the outer ends of the slides 70 by swaged lugs 88. When one cable 85 is pulled to move a slide 70, the other cable 85 in the same slide 70 remains stationary, in effect, the lug 88 thereon sliding in a passage 87 while the other lug 88 pulls the slide 70 outwardly compressing the spring 81. The cables 85 (one complete one shown in FIG. 3) extend from the housing 63 to the four grab bar assemblies 2 (FIG. 1).

Figures 9, 10:
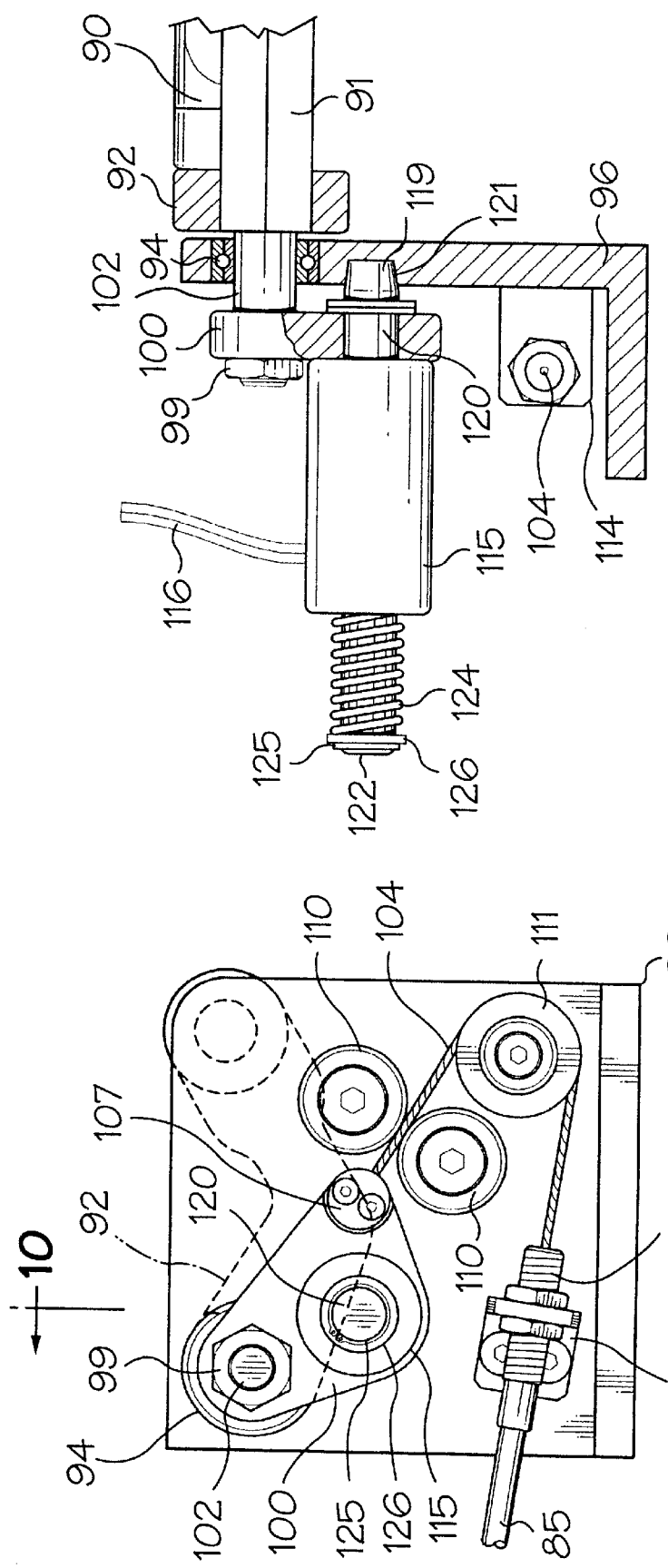
FIG. 9 is a front view of one end of a grab bar and cable connector used in the system of FIGS. 1 and 2.
FIG. 10 is a cross section taken generally along line 10—10 of FIG. 9.
Figures 11, 12:
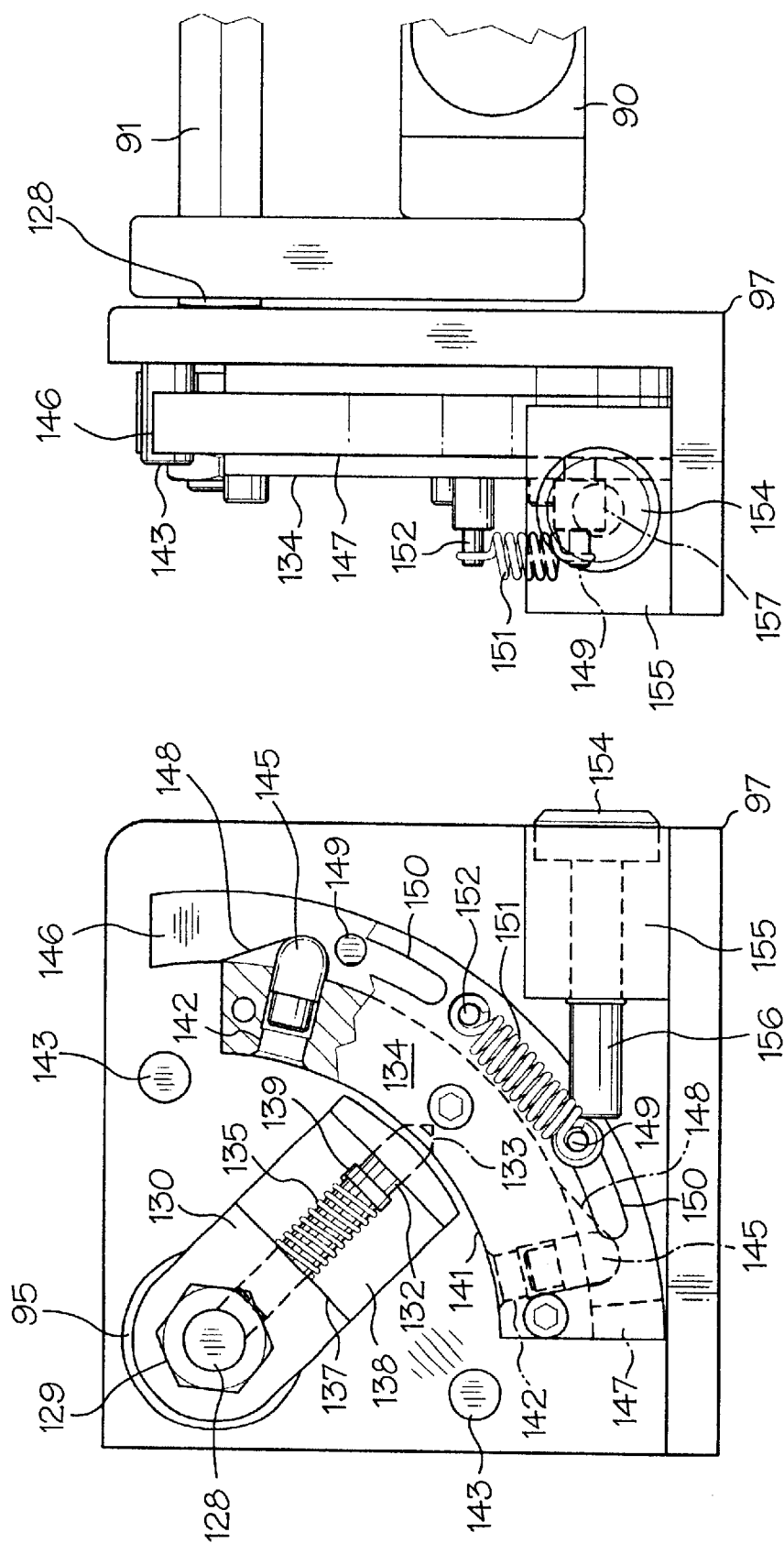
FIG. 11 is a partly sectioned front view of a lock assembly on a second end of a grab bar used in the system of FIGS. 1 and 2.
FIG. 12 is an end view of the latch assembly as seen from the right in FIG. 11.

As mentioned above, each grab bar assembly 2 is pivotably mounted in a recess 8 in the inner skin 6 of the fuselage. Each grab bar assembly 2 includes a cylindrical grab bar 90 which can be pushed or pulled to release the win row 1. The ends of each grab bar 90 are connected at each end to a shaft 91 by generally chevron-shaped pivot arms 92 (FIG. 9). Pushing or pulling of a grab bar 90 results in rotation of the shaft 91 in bearings 94 and 95 mounted in L-shaped brackets 96 and 97, respectively (FIGS. 9 and 11). The shaft 91 extends through the bearing 94 and 95, and the brackets 96 and 97.

Referring to FIGS. 9 and 10, a nut 99 retains a generally triangular lever 100 on one outer end 102 of the shaft 91. The shaft 91 is connected to one corner of the lever 100, and one end 104 of one cable 85 is connected to an opposite corner of the lever by a pivoting cable clamp 107. Thus, rotation of the shaft 91 and consequently of the lever 100 in either direction results in pulling of the cable 85 to move the pin 62 (FIG. 8) of the drive latch assembly to the release position. The spring 57 in the drive mechanism 35 (FIG. 7) pushes the sleeve 59 and the rack 37 in one direction, and the pinion 42 causes movement of the rack 38 in the opposite direction to move the pins 16 to the window releasing position. The end 104 of the cable 85 passes between guide rollers 110, defined by ball bearings mounted on the brackets 96. The cable 85 passes around a third, guide pulley 111. A threaded coupler 112 on the end of the cable 85 is mounted in an L-shaped bracket 114 mounted on the bracket 96 beneath the lever 100.

Figure 16:
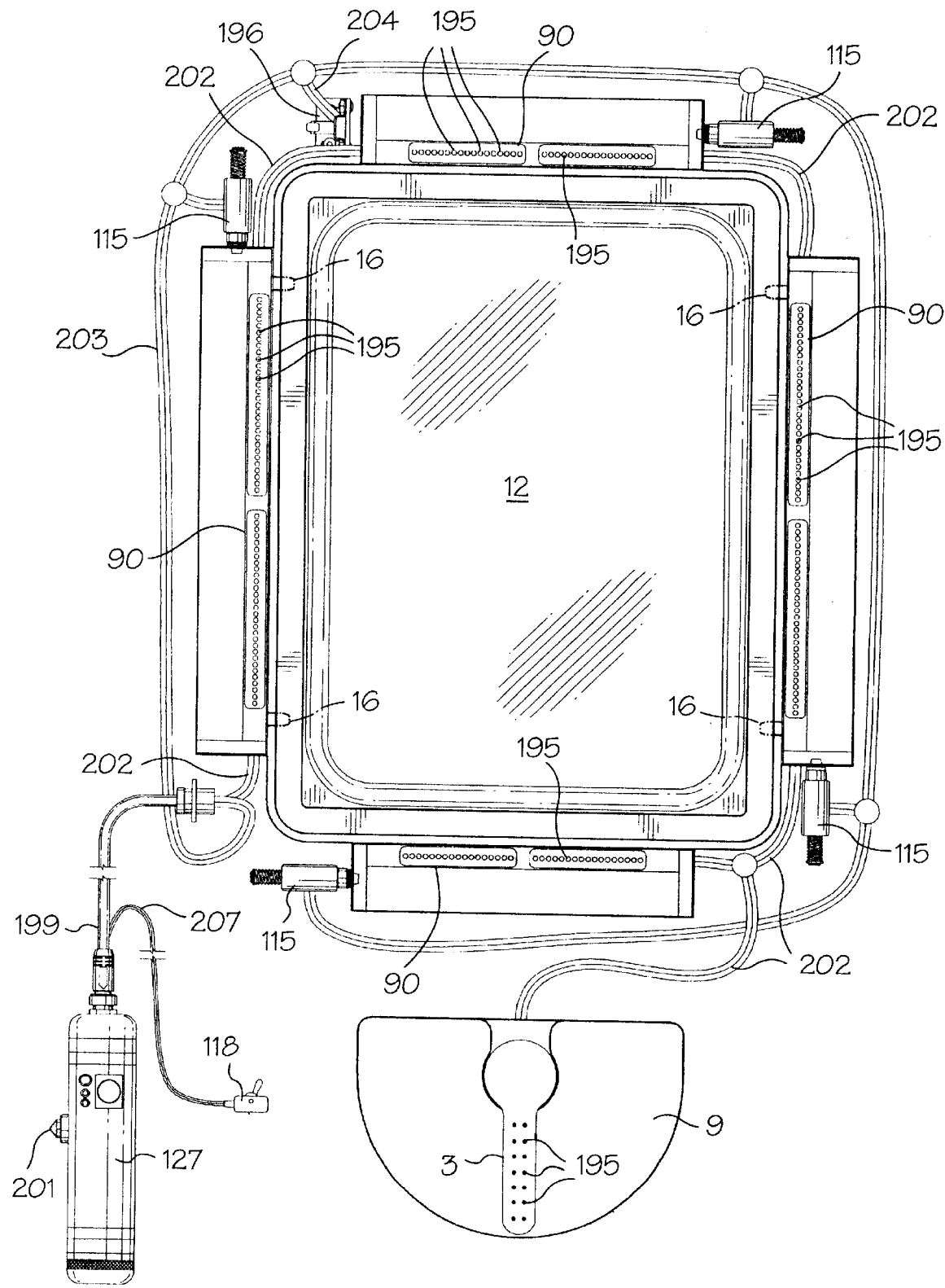
FIG. 16 is a front view of a light assembly used in the system of FIGS. 1 and 2.

Release of the window 1 by accidental rotation of one of the grab bars 90 is prevented by a solenoid 115 mounted on the lever 100. The solenoid 115 is connected by a wire 116 to a switch 118 (FIG. 16) in the cockpit of the aircraft for actuation by an operator of the aircraft. One end 119 of the solenoid plunger 120 extends through the lever 100 into a recess 121 in the bracket 96 preventing rotation of the lever 100 and consequently of the shaft 91 until the plunger 120 is retracted by de-energizing the solenoid 115. The other end 122 of the plunger 120 extends beyond the free end of the solenoid body. A helical spring 124 retained on the plunger 120 by a C-clip 125 and a washer 126 retracts the plunger 120 from the latching position when the solenoid 115 is de-energized. Thus, when the electrical system of the aircraft is turned on, the grab bars 90 are automatically disabled, i.e. the solenoid 115 is energized. The solenoids 115 (one for each grab bar 90) are automatically disabled by a plurality of sensors, i.e. impact, rollover or immersion (not shown) in a lighting control unit 127 (FIG. 16) which triggers in an emergency situation. Loss of aircraft power will also de-energize the solenoids 115 and enable the grab bars 90. When the solenoids 115 are de-energized, the springs 124 retract the plungers 120 from the recesses 121 in brackets 96 permitting rotation of the shafts 91 and the grab bars 90.

Once the window I is released, the grab bar 90 which has been pushed or pulled to the release position remains in such release position. With reference to FIGS. 11 and 12, the grab bars 90 and the shafts 91 are releasably held in neutral positions and positively retained in the panel release position by a detent mechanism at the other end of each grab bar assembly 2. For such purpose, the other end 128 of each shaft 91 extends through and is rotatable in the bearings 95 in the L-shaped brackets 97. A nut 129 retains a detent arm 130 on such other end 128 of the shaft 91. A plunger 132 with a rounded bottom end is slidably mounted in the arm 130 for releasably engaging a conical recess 133 in an arcuate detent housing 134 mounted on the bracket 97. The plunger 132 is biased into the recess 133 by a helical spring 135 mounted on the plunger 132 between one end 137 of a notch 138 in the arm 130 and an annular flange 139 on the plunger 132. When the shaft 91 is rotated in either direction (clockwise or counterclockwise), the plunger 132 escapes from the recess 133 and slides along an arcuate side 141 of the detent housing 134 where it enters one of a pair of holes 142 near the ends of the housing 134. At the same time, the one side of the arm 130 encounters one of a pair of stop pins 143 mounted on the bracket 97 proximate the ends of the detent housing 134. When the plunger 132 enters either of the holes 142, the grab bar 90 and the shaft 91 are locked in the release position.

In order to return the grab bar 90 to the neutral position, the plunger 132 must be forcibly pushed out of the hole 142. This is effected by a release plunger 145 mounted in each of the holes 142. The plungers 145 are moved to the release position by an arcuate cam slide 146 slidably mounted in a channel 147 of generally C-shaped cross section in the outside of the housing 134. In their neutral position, the hemispherical outer ends of the plungers 145 rest in tapering recesses 148 in the inner side of the cam slide 146. Pins 149 extend outwardly from the slide 146 through arcuate slots 150 in the housing 134 for guiding the slide 146 along an arcuate path of travel parallel to the side 141 of the housing 134.

The slide 146 is normally retained in a rest position (FIG. 11), in which the plungers 145 are retracted, by a helical spring 151 extending between one of the pins 149 and a post 152 on the housing 134. The slide 146 is moved to the plunger release position by pushing on a detent release button 154 in one end of a housing 155 mounted on the bracket 97. When the button 154 is pressed, a plunger 156 extending out of the other end of the housing pushes against the body 157 of one of the pins 149 which moves the cam slide 146 against the bias of the spring 151. Pushing the cam slide 146 causes the plungers 145 to ride out of the recesses 148, pushing the plunger 132 out of the hole 142. With the plunger 132 released, it is possible to rotate the grab bar 90 manually to the rest position, i.e. to reset the grab bar assembly 2. When the button 154 is released, the spring 151 returns the slide 146 to the rest position.

Figure 13:
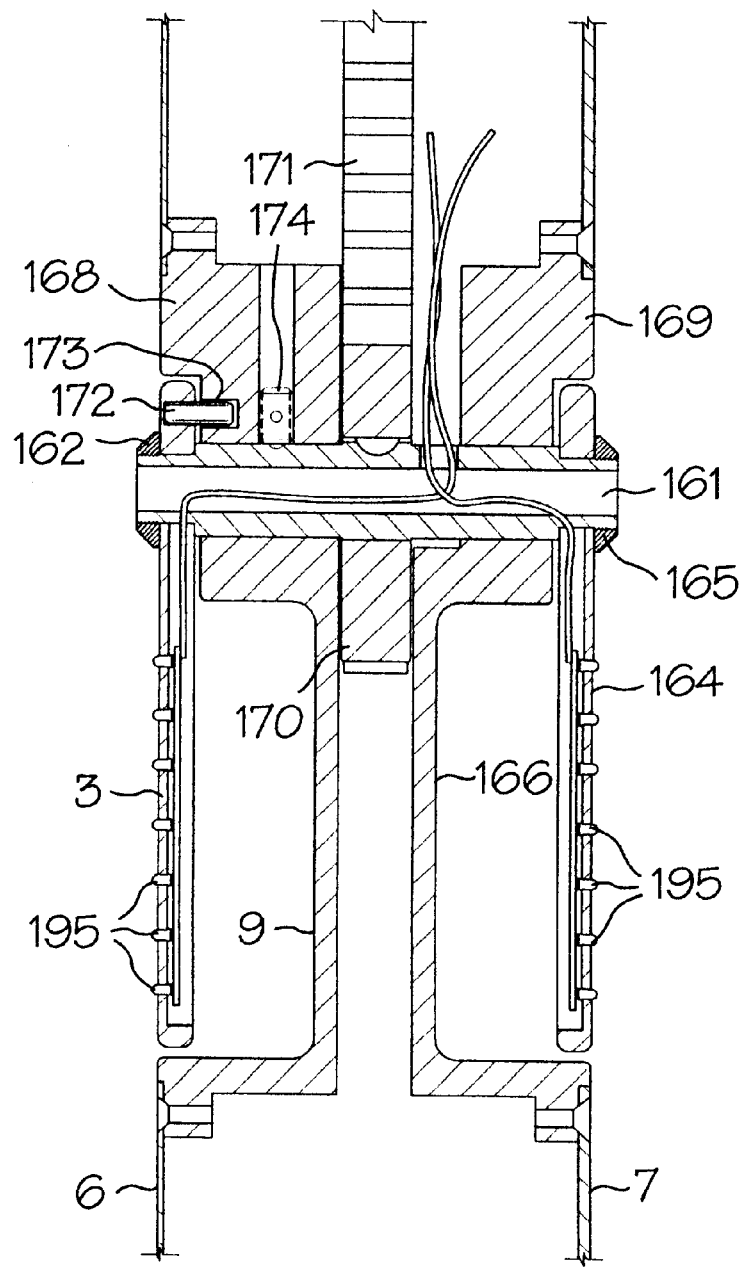
FIG. 13 is a cross section of handles for an auxiliary release assembly used in the system of FIGS. 1 and 2.
Figure 14:
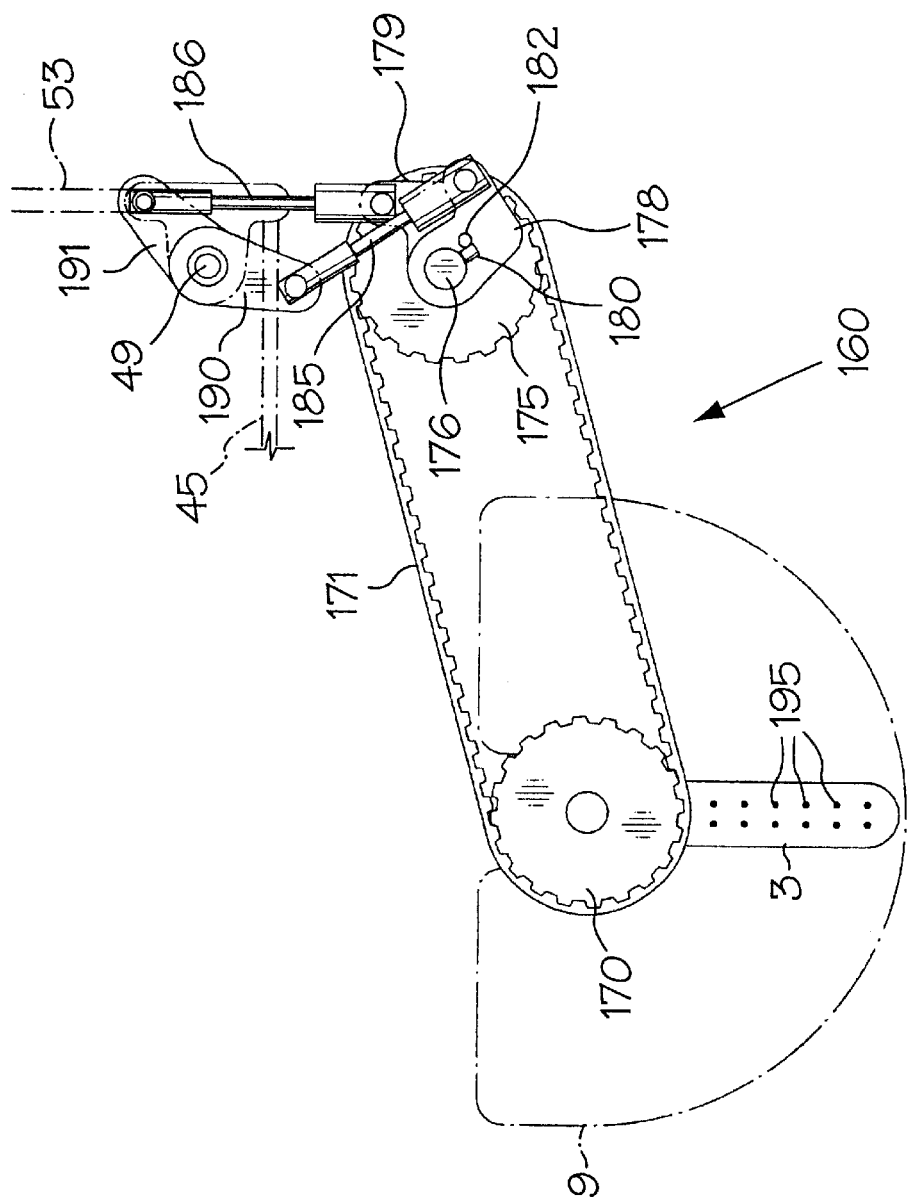
FIGS. 14 and 15 are partly sectioned front and rear views of the auxiliary release assembly used in the system of FIGS. 1 and 2.
Figure 15:
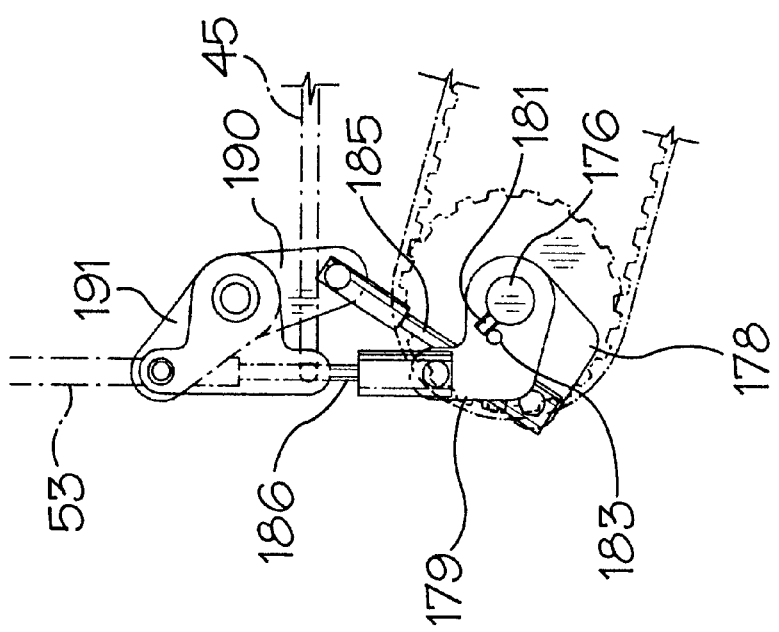

Referring to FIGS. 13 to 15, the auxiliary release handle 3 (FIGS. 1 and 3) forms part of an auxiliary release assembly generally indicated at 160 (FIG. 14). As mentioned above, the handle 3 is mounted in a recess 9 in the inner skin 6 of the fuselage. The handle 3 is mounted on one end of a hollow spindle 161 by means of a nut 162. A similar handle 164 is retained on the other end of the spindle 161 by a nut 165 in a recess 166 in the outer skin 7 of the fuselage. The recess 166 similar to and opposed to the recess 9. Both of the handles 3 and 164 and consequently the spindle 161 can be rotated in a clockwise or counterclockwise direction. The spindle 161 is mounted. in housings 168 and 169 connected to the inner and outer skins 6 and 7, respectively of the fuselage. A toothed pulley 170 is securely mounted on the centre of the spindle 161 between the housing 168 and 169 for rotating an endless drive belt 171. A limit pin 172 extends inwardly from one end of the handle 3 into a semicircular slot 173 in the housing for limiting rotation of either handle 3 or 164 in either direction. A detent plunger 174 in the housing 168 releasably retains the spindle 161 and consequently the handles 3 and 164 in the vertical rest or non-use positions (FIGS. 1 and 3).

As best shown in FIGS. 3 and 14, the drive belt 171 extends around a second toothed pulley 175 rotatably mounted on a shaft 176 in a small frame (not shown) between the inner and outer skins 6 and 7. The shaft 176 carries a pair of opposed, generally chevron-shaped arms 178 and 179, which are rotatable on the shaft 176. A pair of lugs 180 and 181 extend outwardly from the shaft 176 for engaging pins 182 and 183 on the arms 178 and 179, respectively. When the handle 3 or 164 and consequently the shaft 176 are rotated in one direction, the lug 180 engages pin 182 to cause rotation of the arm 178 while the arm 179 continues to rotate on the shaft 176. By the same token, when the handle 3 or 164 is rotated in the opposite direction, the lug 181 engages the pin 183 to cause rotation of the arm 179 while the arm 178 is free to rotate relative to the shaft 176.

The free ends of the arms 178 and 179 are pivotally connected by linkage rods 185 and 186 to the outer ends of generally triangular levers 190 and 191, respectively. The levers 190 and 191 are securely mounted on the shaft 49 carrying the bell crank lever 44, so that rotation of either lever 190 or 191 causes corresponding rotation of the shaft 49. When the shaft 49 rotates the bell crank lever 44 also rotates pushing the rod 45 and consequently the rack 37. During this action, the rod 45 slides through the spring 57 and the sleeve 59. Movement of the rack 37 results in simultaneous movement of the rack 38, rotation of the other lever 44, and consequently movement of the pins 16 to the release position.

In order to re-latch the window 1, the first step is to depress the push button 154 (FIG. 11) to release the shaft 91 in the manner described above. The grab handle 90 can then be manually returned to the rest or neutral position. If one of the handles 3 or 164 was rotated to release the window 1, the handle is re-positioned by rotating it in the opposite direction to the vertical position. The window is pushed into the opening. An Allen key (not shown) is inserted into the recess 42 in the pinion 41. When the pinion 41 is rotated (counterclockwise in FIG. 7) the racks 37 and 38 are caused to move back to the cocked position shown in FIG. 7. In the event that one of the grab handles 90 was used to release the window, movement of the rack 37 in this manner pushes the sleeve 59 against the spring 57 to compress the latter. When the sleeve 59 reaches the center of the block 36, the spring 66 of the drive release assembly (FIG. 8) pushes the pin 62 into the sleeve 59, i.e. the drive mechanism is re-cocked. In either case, rotation of the pinion 41 causes movement of the racks 37 and 38 in the opposite direction to that used for release, whereby the bell crank levers 44 are rotated and the slides 23 are moved upwardly to return the pins 16 to the extended, window engaging positions re-latching the window 1 in the fuselage.

An emergency lighting system (FIG. 16) facilitates location of the grab bars 90 and the handles 3 and 164, and provides a positive indication that the window has been jettisoned. The lighting system includes high intensity light emitting diodes (LEDs) 195 located in transparent, plastic sections of each grab bar 90 and in the auxiliary release handles 3 and 164, and a strobing switch 196 which signals the jettisoning of the window 1 to the lighting control unit 127.

The lighting control unit 127 is mounted on the inner skin 6 of the aircraft at a separate location from the emergency escape window 1, and is connected to the wiring for the window lighting system by a power cable 199. The lighting control unit 127 contains a microprocessor, a rechargeable battery pack, an immersion sensor, a rollover sensor, an impact sensor, a watertight, fully submersible casing and an external system test switch 201. Wires 202, 203 and 204 connect the power cable 199 to the grab bars 90, the handles 3 and 164, the solenoids 115 and the strobing switch 196. The lighting system can also be activated by the manually operated switch 118 mounted in the aircraft (typically in the cockpit) which is connected to the control unit 127 by a wire 207.

The emergency lighting system serves three functions during an emergency, namely it provides illumination to the grab bars 90 and the auxiliary handles 3 and 164 for easy location thereof, it identifies the location of the exit by illumination of all four sides thereof using the lighted grab bars 90, and it indicates the lighting window has been jettisoned by changing the status of the lighted grab bars 90 and the handles 3 and 164 from continuously lit to strobing illumination. The lighting system is activated manually by the on/off switch 118, or automatically by immersion of the aircraft in water to submerge the control unit 127, impact of the aircraft with water or land with a force exceeding a preset value, or inversion of the aircraft by more than 90° from its normal vertical upright position. Upon initial activation, the four grab bars 90 and the handles 3 and 164 will be illuminated in a continuous mode. The lighted handle 164 on the exterior of the aircraft is intended to assist rescuers in finding the emergency exit release. Jettisoning of the window 1 closes the switch 196 to change the lighting system status from continuous to intermittent strobing, indicating that the exit opening is clear for egress from the aircraft.

Thus, there has been described a unique, relatively simple emergency exit system in which the window 1 is released by a spring assisted release mechanism. In existing systems, the operator must provide the energy required to release and jettison the escape hatch. In contradistinction, with the system of the present invention, pushing or pulling on any of the grab bars 90 releases a spring drive which provides the energy for releasing the window 1. Moreover, because the window 1 is quickly and easily re-installed in the fuselage, there is a greater incentive to practice emergency escape procedures during flight training.

We claim:

1. An emergency exit system including a panel for closing in an opening in a vehicle wall comprising a plurality of spaced apart panel latch means for releasably latching said panel in said opening; release means for simultaneously releasing all said panel latch means, drive means for operating said release means; drive latch means for releasably retaining said drive means in an inoperative condition; and principal actuating means rotatable in said vehicle wall proximate said opening for releasing said drive means, whereby rotation of said principal actuating means causes said drive means to operate said release means to simultaneously release all said panel latch means.

2. The emergency exit system of claim 1, including auxiliary actuating means for operating said release means independently of said principal actuating means.

3. The emergency exit system of claim 2, including ejector means associated with said panel latch means for ejecting said panel from the vehicle wall when the panel is released by said release means.

4. The emergency exit system of claim 2, including lighting means associated with said principal actuating means and said auxiliary actuating means for lighting up the area of the opening facilitating access to the emergency exit system.

5. The emergency exit system of claim 4, wherein said panel latch means includes a plurality of pin means for releasably retaining said panel in said opening, said release means being adapted to move all said pin means from a latched position in which said panel is retained in the opening and a release position in which said panel is free to escape said opening.

6. The emergency exit system of claim 5, wherein said principal actuating means includes a plurality of individual grab bar means rotatably in the vehicle wall proximate said opening; and cable means connecting each said grab bar means to said drive latch means, whereby said drive means is operated upon rotation of any one of said grab bar means to a release position.

7. The emergency exit system of claim 6, wherein said release means includes cam slide means in said vehicle wall on each side of said opening for vertical movement by said drive means or said auxiliary actuating means, said cam slide means carrying said pin means, whereby vertical movement of said cam slide means in one direction results in movement of said pin means to a panel release position and vertical movement of said cam slide means in the opposite direction results in latching of said panel in said opening.

8. The emergency exit system of claim 7, wherein said drive means includes a rack and pinion assembly for moving said cam slide means and consequently said pin means to the release position; and spring means for driving said rack and pinion assembly.

9. The emergency exit system of claim 4, including strobe switch means for actuation by jettisoning of said panel for causing strobing of said lighting means when the panel has been jettisoned.

10. The emergency exit system of claim 9, including solenoid means preventing accidental rotation of said grab bar means, and switch means for causing release of said grab bar means by said solenoid means.

11. The emergency exit system of claim 1, including detent means for releasably locking said release means and principal actuating means in the release position.

\* \* \* \* \*